(12) United States Patent
Meunier et al.

(10) Patent No.: US 9,843,587 B2
(45) Date of Patent: Dec. 12, 2017

(54) METHOD OF MANAGING ROLE-BASED DIGITAL RIGHTS IN A COMPUTER SYSTEM

(71) Applicant: Clawd Technologies Inc., Drummondville (CA)

(72) Inventors: Sebastien Meunier, Drummondville (CA); Pierre Belisle, Québec City (CA); Guy Dartigues, Montréal (CA)

(73) Assignee: Clawd Technologies Inc., Quebec (CA)

( * ) Notice: Subject to any disclaimer, the term of this patent is extended or adjusted under 35 U.S.C. 154(b) by 0 days.

(21) Appl. No.: 14/417,758

(22) PCT Filed: Jul. 17, 2013

(86) PCT No.: PCT/CA2013/000645
§ 371 (c)(1),
(2) Date: Jan. 27, 2015

(87) PCT Pub. No.: WO2014/015413
PCT Pub. Date: Jan. 30, 2014

(65) Prior Publication Data
US 2015/0200950 A1    Jul. 16, 2015

Related U.S. Application Data

(60) Provisional application No. 61/676,489, filed on Jul. 27, 2012.

(51) Int. Cl.
*G06Q 40/00* (2012.01)
*H04L 29/06* (2006.01)
(Continued)

(52) U.S. Cl.
CPC ............ *H04L 63/101* (2013.01); *G06F 21/10* (2013.01); *G06F 21/57* (2013.01); *G06Q 20/40* (2013.01);
(Continued)

(58) Field of Classification Search
None
See application file for complete search history.

(56) References Cited

U.S. PATENT DOCUMENTS 5,903,882 A * 5/1999 Asay ............... G06Q 10/10
380/30
6,366,929 B1 * 4/2002 Dartigues ....... G06Q 10/06395
(Continued)

FOREIGN PATENT DOCUMENTS

WO    WO-2014/015413    1/2014

OTHER PUBLICATIONS https://blogs.technet.microsoft.com/dmitrii/2009/01/25/registration-authority-and-device-certificates/ Jan. 25, 2009 (Security and Identity).*

(Continued)

*Primary Examiner* — Chika Ojiaku
(74) *Attorney, Agent, or Firm* — Schwegman Lundberg & Woessner, P.A.

(57) ABSTRACT

A computer system manages role-based digital rights by creating a chain of trust that originates with a user who purports to act as a registration authority whose status can be verified to ascertain that the user is licensed to act as the registration authority. The registration authority creates an organization account and a first member whose status is verified by consulting a status verification server. Derivative authorities granted to members are predicated on the first member and ultimately the registration authority to ensure that there is a chain of trust linking each member of an organization back to the registration authority.

31 Claims, 10 Drawing Sheets

(51) Int. Cl.
  *G06F 21/10* (2013.01)
  *G06F 21/57* (2013.01)
  *G06Q 20/40* (2012.01)

(52) U.S. Cl.
  CPC .... H04L 63/126 (2013.01); *G06F 2221/2141* (2013.01); *G06F 2221/2145* (2013.01)

(56) References Cited

U.S. PATENT DOCUMENTS

| | | | |
|---|---|---|---|
| 7,441,239 B2 | 10/2008 | Bittner et al. | |
| 8,898,746 B2* | 11/2014 | Gregg | H04L 63/10 726/29 |
| 2001/0021928 A1* | 9/2001 | Ludwig | G06Q 20/3674 705/67 |
| 2002/0065695 A1* | 5/2002 | Francoeur | G06Q 20/382 705/64 |
| 2004/0187114 A1* | 9/2004 | Bittner | G06F 9/468 718/100 |
| 2006/0069607 A1* | 3/2006 | Linder | G06Q 10/063 705/7.11 |
| 2006/0218394 A1* | 9/2006 | Yang | G06F 21/604 713/167 |
| 2007/0055887 A1* | 3/2007 | Cross | G06F 21/33 713/185 |
| 2007/0088581 A1* | 4/2007 | Treacy | G06Q 40/06 705/4 |
| 2008/0177558 A1* | 7/2008 | Jung | G06Q 40/00 705/35 |
| 2009/0157538 A1* | 6/2009 | Subramaniam | G06Q 10/10 705/35 |
| 2010/0082133 A1* | 4/2010 | Chouinard | G06F 8/20 700/86 |

OTHER PUBLICATIONS

"International Application No. PCT/CA2013/000645, International Preliminary Report on Patentability dated Sep. 3, 2014", (dated Sep. 3, 2014), 19 pgs.

"International Application No. PCT/CA2013/000645, International Search Report dated Oct. 18, 2013", (dated Oct. 18, 2013), 5 pgs.

"International Application No. PCT/CA2013/000645, Response to Written Opinion and Amendment Under Article 34 of the PCT dated May 27, 2014", (dated May 27, 2014), 6 pgs.

* cited by examiner

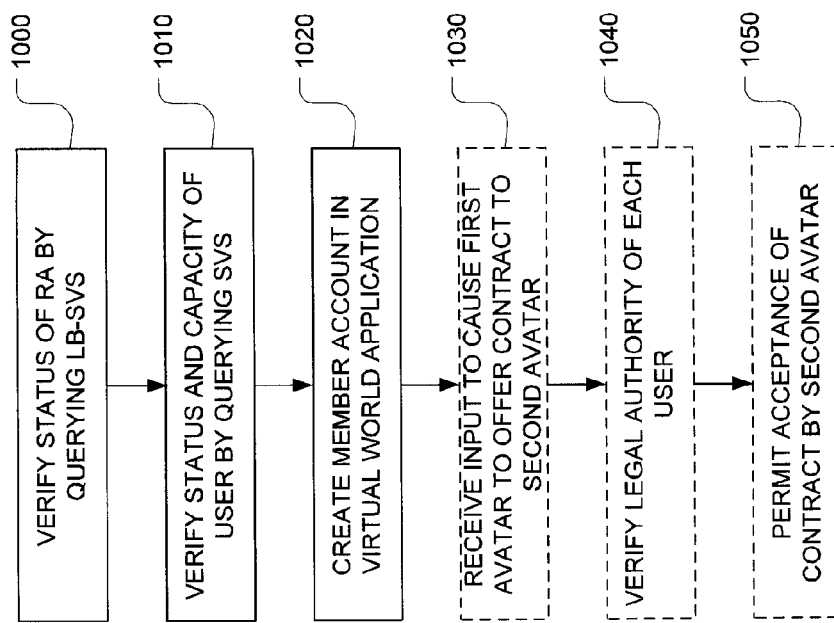

METHOD OF MANAGING ROLE-BASED DIGITAL RIGHTS IN A COMPUTER SYSTEM

PRIORITY CLAIM TO RELATED APPLICATIONS

This application is a U.S. National Stage application filed under 35 U.S.C. §371 from International Application Serial No. PCT/CA2013/000645, which was filed Jul. 17, 2013, and published as WO 2014/015413 on Jan. 30, 2014, and which claims priority to U.S. Provisional Application Ser. No. 61/676,489, filed Jul. 27, 2012, which applications and publication are incorporated by reference as if reproduced herein and made a part hereof in their entirety, and the benefit of priority of each of which is claimed herein.

TECHNICAL FIELD

The present technology relates generally to computer systems and, in particular, to computer-implemented techniques for role-based management of digital rights.

BACKGROUND

Role-based access control (RBAC) is a technique for controlling access to a computer system or network. In an organization's computer system, each user is assigned a role or function (hereinafter "role"). User access rights or permissions to perform tasks within the computer system are assigned to the roles. RBAC thus provides a framework for assigning user access rights and permissions based on the roles, and not directly based on the identity of the users per se.

In a conventional RBAC implementation, however, there is no correlation between an assigned role in the computer system and a real-world legal authority to perform an action on behalf of the organization. A user may occupy a role X that electronically permits him to perform a task Y in the computer system but there is nothing in a conventional RBAC implementation to guarantee that the performance of task Y by the user in role X actually is authorized and/or that it has any legal effect.

While electronic signatures may cryptographically provide identification and non-repudiation mechanisms, there is no way to ascertain that an electronic signature, or other electronic transaction or digital act performed by a user occupying a given role is actually legally authorized. The legal authority of the user occupying a given role has to date been overlooked by RBAC systems.

This issue has implications not only in terms of internal corporate governance but also in the realm of e-commerce, especially in an international e-commerce transaction between distant organizations in which one user of a first organization may not be able to readily ascertain that another user of a second organization actually has authority to bind the second organization.

One e-commerce solution for role-based authorization is disclosed in U.S. Patent Application Publication 2001/0021928 (Ludwig et al.) entitled "Method for Inter-Enterprise Role-Based Authorization" that uses role certificates to enable one user from a first organization to authenticate another user from a second organization. However, this technology does not purport to link a role to a real-world legal authority to act on behalf of an organization.

Such a solution is disclosed in the present specification and the appended drawings.

BRIEF DESCRIPTION OF THE DRAWINGS

Further features and advantages of the present technology will become apparent from the following detailed description, taken in combination with the appended drawings, in which:

FIG. 10 is a flowchart depicting steps of a method of conferring legal authority to avatars that represent users within a computer-generated virtual world.

It will be noted that throughout the appended drawings, like features are identified by like reference numerals.

SUMMARY

Figure 1:
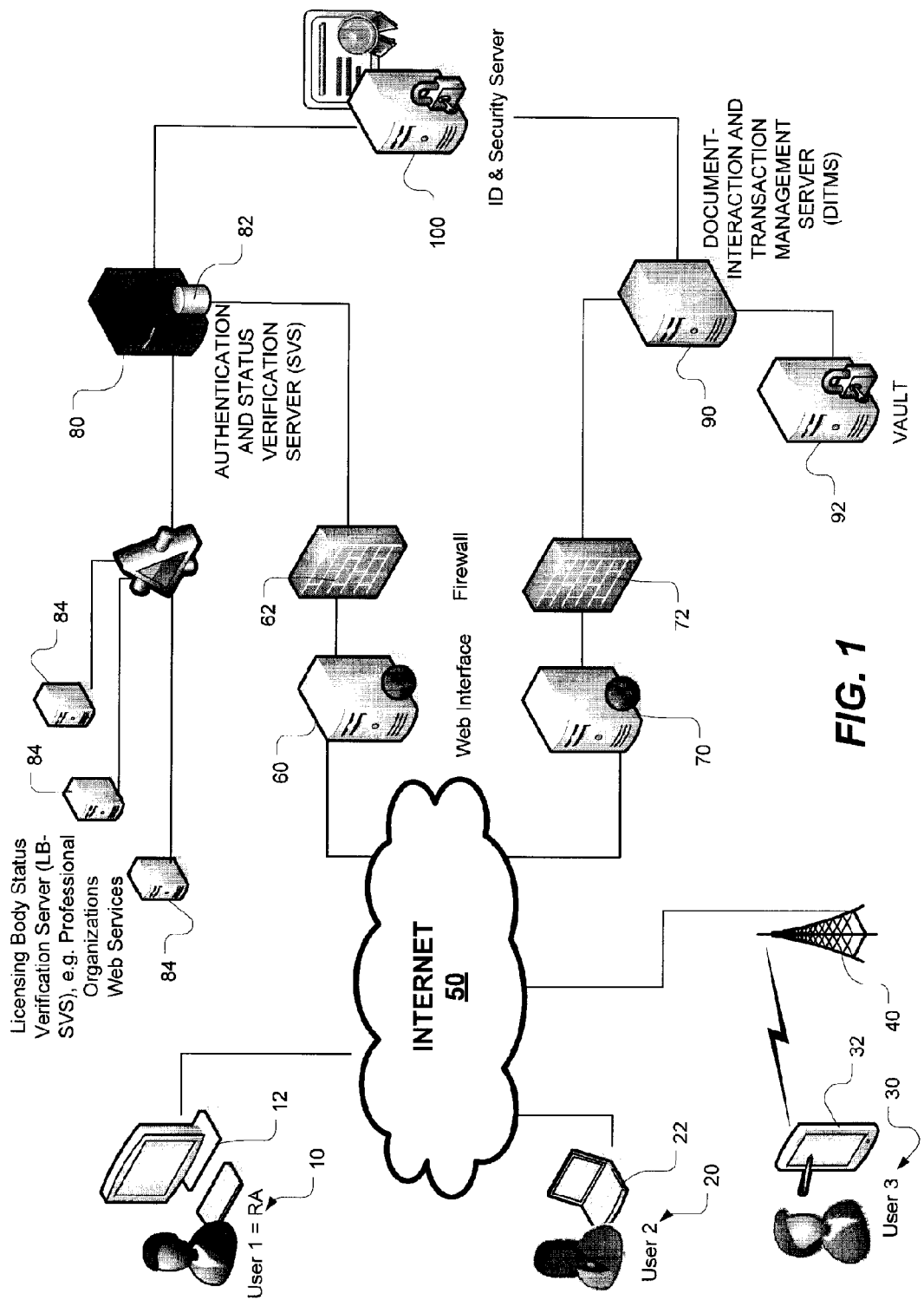
FIG. 1 is a schematic depiction of a computer system for managing role-based digital rights in accordance with embodiments of the present invention.

In general terms, the present invention provides a novel computer system, computer-implemented method, and computer-readable medium for managing role-based digital rights. The embodiments of the present invention implement an innovative paradigm for defining roles in the computer system that rely directly or indirectly on a registration authority who is licensed by a licensing body to ascertain the identity of any legal entity such as an organization or person. For the purposes of this specification, the term "ascertain" shall be understood to describe the process of verifying the information that enables the registration authority to ascertain the legal status of an entity or the identity of an individual. Furthermore, the present specification shall use the term "verify" in a broad sense to encompass the concept of ascertaining. The paradigm ensures that every registered user of the system has been duly ascertained by a registration authority. The users may then be assigned roles by the registration authority which confer rights or permissions to undertake certain acts in the system. Any action by the user within the system is presumed to be legally valid as the authority of the user derives ultimately from the registration authority. This creates a chain of trust originating from a registration authority to a verified user of the system. Because of the chain of trust, other users of the system may presume that the acts of a given user is valid and enforceable. This chain-of-trust paradigm transposes onto a digital platform the real-world process of verifying each user's identity and ascertaining that the user's role confers proper authority to take certain acts. This technology greatly facilitates acts that are internal to the organization (e.g. resolutions, shareholder votes, or other internal governance processes) and also acts that are external to the organization (e.g. tendering, procurement, contracting). This technology also greatly facilitates transactions in a virtual world.

With this in mind, there are a number of aspects of the present invention that will be described.

One aspect of the present invention is a computer-implemented method of managing role-based digital rights in a computer system. The method entails (i) verifying a legal status of a first user seeking to act as a registration authority by sending a status verification request to a licensing body server that stores status information regarding the legal status of the first user to ascertain that the first user is licensed to act as the registration authority; (ii) verifying a legal status of an organization having a hierarchical structure of roles by sending a status verification request to a status verification server that stores status information regarding the legal status of the organization verified by the registration authority or by any other registration authority deriving authority from an original registration authority; (iii) receiving user input from the registration authority to create an account for the organization within a document-interaction and transaction management application that enables interaction with electronic documents securely stored in a virtual vault and electronic transactions to be performed for the organization; (iv) verifying a legal status of a first member of the organization by sending a status verification request to the status verification server, the first member having been verified by the registration authority or by any other registration authority deriving authority from the original registration authority, wherein the registration authority also verifies that the first member has a legal capacity to act in the first role; and (v) receiving user input from the registration authority to define a first role within the organization for the first member, the first role conferring a first authority to act on behalf of the organization, wherein the first authority of the first member is predicated on the registration authority.

Another aspect of the present invention is a computer readable medium upon which are stored instructions in code that are configured to perform the steps, acts or operations of the foregoing method when the computer readable medium is loaded into memory and executed on a processor of a computing device.

Yet another aspect of the present invention is a computer system for managing role-based digital rights, the system comprising (i) an application server having a processor operatively coupled to a memory to execute a document-interaction and transaction management application that enables interaction with electronic documents securely stored in a virtual vault and electronic transactions to be performed for the organization; (ii) a licensing body server for verifying a legal status of a first user seeking to act as a registration authority by receiving a status verification request and for that stores status information regarding the legal status of the first user to ascertain that the first user is licensed to act as the registration authority; and (iii) a status verification server for storing status information about organizations and members whose legal status has been verified by the registration authority or any other registration authority deriving authority from an original registration authority, wherein the registration authority also verifies that the first member has a legal capacity to act in the first role. The application executing on the application server is programmed to send a status verification request to the licensing body server to verify the status of the registration authority, send a status verification request to the status verification server to verify a status of an organization, receive user input from the registration authority to create an account for the organization within the application, send a status verification request to the status verification server to verify a status of a first member of the organization, and receive user input to define a first role within the organization for the first member, the first role conferring a first authority to act on behalf of the organization, wherein the first authority of the first member is predicated on the registration authority.

The invention may also be used to facilitate e-commerce between two organization that are using the document-interaction and transaction management application as a common platform. The application mediates the transaction to ensure that members of each organization have authority to bind their respective organizations.

Accordingly, one aspect of the present invention is a computerized method of e-commerce between a first organization and a second organization each having a hierarchical structure of roles defined within a common document-interaction and e-ecommerce transaction application hosted in a distributed computing environment, wherein the roles confer different authorities to transact on behalf of the respective organizations. The method comprises receiving user input from an offering member of the first organization requesting that the document-interaction and transaction management application generate an electronic contract document representing an offer to enter into a contract, verifying by the application that the offering member of the first organization occupies a role having authority to contractually bind the first organization with respect to the contract, the role having being defined by a first member whose status has been verified by a registration authority, wherein the registration authority also verifies that the first member has a legal capacity to act in the first role. The method then involves generating the electronic contract document and permitting the first member to electronically sign the document only if the offering member has the authority to contractually bind the first organization with respect to the contract. The method then entails receiving user input identifying an accepting member who is to receive the electronic document at the second organization. The method includes verifying by the application that the accepting member occupies a role conferring authority to accept the offer on behalf of the second organization, the role being defined by a second member whose status has been verified by a registration authority. Finally, the method includes transmitting the electronic contract document from the offering member of the first organization to the accepting member of the second organization if the accepting member has the authority to accept the offer, receiving user input from the accepting member of the second organization to electronically sign the document to accept the offer, and transmitting an electronic acceptance of the contract to the offering member of the first organization.

Another aspect of the present invention is a computer readable medium upon which are stored instructions in code that are configured to perform the steps, acts or operations of the foregoing method when the computer readable medium is loaded into memory and executed on a processor of a computing device.

Another aspect is a computer system for e-commerce, the system that includes an application server having a processor coupled to a memory for executing instructions in code of a document-interaction and transaction management application to facilitate e-commerce between a first organization and a second organization each having a hierarchical structure of roles conferring different authorities to transact on behalf of the respective organizations. The system includes a first computing device for receiving user input from an offering member of the first organization requesting that the application generate an electronic contract document representing an offer to enter into a contract. The application is programmed to verify that the offering member of the first organization occupies a role having authority to contractually bind the first organization with respect to the contract, the role having been defined by a first member whose status has been verified by a registration authority, wherein the registration authority also verifies that the first member has a legal capacity to act in the first role. The application is further programmed to generate the electronic contract document and permit the offering member to electronically sign the document only if the offering member has the authority to contractually bind the first organization with respect to the contract. The first computing device further receives user input identifying an accepting member who is to receive the electronic document at the second organization. The application is programmed to verify that the accepting member occupies a role conferring authority to accept the offer on behalf of the second organization, the role having been defined by a second member whose status has been verified by a registration authority. The application is then programmed to transmit the electronic contract document from the offering member of the first organization to the accepting member of the second organization if the accepting member has the authority to accept the offer. The system includes a second computing device for receiving user input from the accepting member of the second organization by electronically signing the document to accept the offer. The application is then programmed to transmit an electronic acceptance of the contract to the offering member of the first organization.

The present invention also has applicability to virtual worlds. The present invention may be used to confer legal authority on avatars interacting in a virtual world. Yet another aspect of the present invention is a computer-implemented method of conferring legal authority to avatars that represent users within a computer-generated virtual world in which the users interact with each other via their respective avatars. The method comprises verifying a legal status of a registration authority by sending a status verification request to a licensing body server to ascertain that the registration authority is licensed to act as the registration authority; verifying a status and capacity of a user seeking to become a member of the virtual world by sending a status verification request to a status verification server that stores status information regarding the legal status of the user and the legal capacity to become a member of the virtual world, wherein the legal status and legal capacity have been verified by the registration authority or by any other registration authority deriving authority from an original registration authority; and receiving user input from the registration authority to create an account for the member within the virtual world, the account linking the member to a unique avatar, wherein the authority of the avatar in the virtual world is predicated on the registration authority.

The details and particulars of these aspects of the invention will now be described below, by way of example, with reference to the attached drawings.

DETAILED DESCRIPTION

In general, the embodiments of the present invention relate to a novel computer system, computer-implemented method, and computer-readable medium for managing role-based digital rights. The embodiments of the present invention implement an innovative chain-of-trust paradigm that employs registration authorities (e.g. lawyers) who are licensed by a licensing body (e.g. a state or provincial bar) to verify the identities of persons wishing to become system users.

One or more original (seminal) registration authorities may create additional registration authorities by verifying the identity of each of those additional registration authorities who may, in turn, create further registration authorities. As a result, a group of registration authorities will be required for any given jurisdiction in which the system is to be deployed.

A person wishing to register as a user of the system must have his or her identity verified by one of these registration authorities. Only if the person's identity has been duly verified by the registration authority may a user account be created and/or the user added to a user database as a known entity. Similarly, an entity or organization (e.g. a corporation) must be verified (in terms of its legal status) by a registration authority before an account for the organization is created in the system. Accordingly, only entities that have been verified by a registration authority may access and utilize the system. The platform is thus restricted to entities whose identities have been formally verified by registration authorities having a statutory power of certification. The user may then be assigned a role in an entity or organization. The role determines a set of rights, permissions, privileges, etc. within the document-interaction and transaction management application, as will be explained in greater detail below. As a precondition for assigning a role to a registered user, the system verifies that the user is entitled (has legal capacity) to occupy that role. This decision may be made by the RA or by the system by comparing attributes of the user with legal requirements for the role.

Although the primary application of this technology is to an organization such as a corporation having a hierarchical set of roles within a pre-existing legal framework, the technology may also be used or adapted to manage digital rights with respect to any entity, where an entity is understood broadly to encompass a body corporate, trust, partnership, foundation, unincorporated association, group or any such organization, as well as a government, agency, bureau, office, department or ministry of the government. In one embodiment, the entity may also include a natural person (i.e. an individual) who has the legal capacity to delegate authority to another person within a certain legal framework, e.g. granting a power of attorney. For example, a natural person User A (who is a verified registered user) may grant a power of attorney to another person User B (who is also a verified registered user). The identities of User A and User B are verified by one or more registration authorities. The system may also, in some limited cases, verify some invariant elements of User A's legal capacity to grant the power of attorney and of User B's legal capacity to accept the power of attorney. The system thus can provide some basic information regarding legal capacity such as age that help ensure that actions taken by User B when exercising the power of attorney are legally valid and binding on User A. The system also ensures that a third party (User C) interacting with User A may rely on the authority granted to User B. This example demonstrates how an entity may be a natural person.

System

FIG. 1 schematically depicts a computer system in accordance with an embodiment of the present invention. This computer system has two main components: (i) an authentication and status verification server (SVS) and its associated user database whose general function is to authenticate users and (ii) a document-interaction and transaction management application whose general function is to provide authenticated users with a software interface for interacting with documents and performing electronic actions and tasks with respect to an organization of which the user is a member having an assigned role.

As depicted by way of example in FIG. 1, a plurality of users who are designated by reference numerals 10, 20, 30 communicate with the computer system over a data network, e.g. Internet 50, using wired or wireless digital data communication technology. For the sake of illustration, three such users (User1, User2, and User3) are depicted by way of example in FIG. 1 although the number of users may vary. Again for the sake of illustration, User1 connects to the system via the Internet 50 using a desktop computer 12, User2 connects to the system via the Internet 50 using a laptop 22 and User3 connects to the system via mobile device 32 communicatively connected to the Internet via a wireless network and gateway. Standard communication protocols, such as TCP/IP, HTTP, etc may be used to connect to the system through the Internet.

The mobile device 32 may be any wireless communication device, smart phone, cell phone, wireless-enabled PDA, wireless-enabled tablet, or other portable or handheld electronic device that has wireless communication capabilities. The mobile device 32 may connect wirelessly to the system via wireless network (represented schematically by base station tower 40) using any known cellular technologies or communication protocols such as, for example, GSM, EDGE, LTE, CDMA, etc. Other wireless technologies may of course be employed such as, for example, Wi-Fi™, Bluetooth®, satellite link, etc.

As depicted in FIG. 1, the users connect to Web interface servers 60, 70 which are respectively connected via firewalls 62, 72 to an authentication and status verification server (SVS) 80 and to a document-interaction and transaction management server (DITMS) 90.

As depicted in the exemplary architecture shown in FIG. 1, the SVS 80 and the DITMS 90 are both connected to a common ID and security server 100 (hereafter referred to simply as an "identification server").

SVS

The SVS 80 receives and processes authentication requests from registered users. If the user is registered and authenticated, e.g. by multi-factor authentication sufficient to establish that the user is who he purports to be, access to the system is granted. The SVS 80 also stores user profile information for each registered user. In another embodiment, the authentication and verification functions may be decoupled and performed by physically distinct servers.

The SVS 80 is consulted or queried by the DITMS when it is necessary to ascertain that the user is registered with the system and has a proper status. In other words, the DITM application relies on the SVS to ensure that users of the application are registered users that have been duly verified by a registration authority. The SVS guarantees that the users of the DITM application are registered users who electronic identities can be trusted. In one implementation, the SVS may be replaced by an entity status verification system that stores entity status information once entities have been duly verified by an RA.

LB-SVS

In the implementation illustrated in FIG. 1, the SVS 80 is further configured to communicate with a licensing body status verification server 84. The licensing body status verification server (LB-SVS) may be a professional organization web services or other system that stores status information of registration authorities. The LB-SVS is thus consulted when it is necessary to ascertain that a user who is acting as a registration authority is a member in good standing of the licensing body and thus legally entitled to act at that moment in time as a registration authority. For example, the professional licensing body may be a state or provincial bar that regulates and licenses lawyers. The roster of lawyers who are members of a state or provincial bar is supplemented with continually updated status information so that the system can ascertain that a lawyer seeking to act as a registration authority is still, at that moment in time, in good standing.

DITMS

The document-interaction and transaction management server (DITMS) 90 may execute a document-interaction and transaction management (DITM) application hosted by the DITMS 90. The DITM application provides a panoply of functionalities permitting system users to access and interact with documents in the document vault (secure virtual vault 92). For the purposes of this specification, interacting with documents shall be understood in a broad sense to mean acts, actions, activities, transactions, or tasks performed in relation to a document such as, but not limited to, opening, accessing, viewing, creating, editing, annotating, commenting, highlighting, deleting, cutting, copying, pasting, importing, exporting, e-mailing, archiving, voting, approving, etc. Thus, the DITM application enables a user to perform a plurality of functions on the documents and data in the secure vault.

In one example, the organization may be a corporation. Its important corporate documents such as its minute book, articles of incorporation, corporate bylaws, resolutions, shareholder agreements, security offerings, etc. are stored in electronic form in the vault. Access to these documents by the corporation's directors, officers, employees, external lawyers, accountants, etc. is controlled by assigning to each user a role within the corporation account in the application. Thus, the role of director may confer much greater access rights than the role of mere employee.

In addition to document-related interactions, the DITM application enables the user to perform and manage transactions. Transactions are meant to broadly encompass any external business activities (e.g. contracting with other organizations using the same DITM software platform, filing tax returns, filing documents for securities compliance or with any other government or regulatory agency, etc.) or any internal activities of the organization (e.g. governance-related activities, such as resolutions, votes, approvals, appointments, shareholder agreements, additions to the minute book, etc.) such as, either internally within the organization or externally with another organization, or even within a virtual world.

The DITM application enables these various actions to be performed by a user occupying a role that confers the authority to perform the action. In other words, the access rights, usage rights, permissions, and privileges accorded to a given user are determined by the role assigned to the user within the organization. The role for the first member or plurality of first members is defined by the registration authority. Subsequently, the first member may create a subsidiary (second) role for a second member by exercising a derivative role-creation right provided such a right was conferred on the first member by the RA. The second member may create a third role for a third member if the second role has its own derivative role-creation right. As will be appreciated, any number of subsidiary roles may be created in a hierarchical chain that originates with the registration authority. Each member in the chain must be a system user who has been verified by an RA. The authority of a member is thus linked to (or predicated on) the registration authority.

The DITM application may be stored on and executed by a single server machine (computing device) as shown by way of example in FIG. 1 or, alternatively, it may be stored on and executed separately by a server cluster or in a cloud-computing environment. The DIMTS 90 that runs the DITM application may be physically distinct from the secure document vault 92 or these may be consolidated as a single machine. In other embodiments, there may be multiple servers and/or multiple vaults 92, e.g. to segregate data by jurisdiction.

Each server (computing device) may include one or more processors (or microprocessors), memory (hard disk drive, solid state drive, etc.), one or more data buses, communications ports and input/output devices.

The SVS 90 and the DITMS 90 together provide a virtual platform for authenticating users and for permitting the users to interact with digital documents stored in a virtual vault or to perform digital transactions with respect to the organization of which the users are members. The DITMS 90 queries the SVS to verify the status of a user of the DITM application when that user is to be assigned a role. Only if the status verification is OK does the DITMS assign a role to the user. In most embodiments, the DITMS and/or the SVS communicates directly or indirectly with the LB-SVS to verify a status of an RA when the RA performs an operation in the DITM application.

System Operation and Interaction

Prior to accessing the system, each user must become a registered user of the system. As noted above, a person seeking to become a registered user of the system must be verified by a registration authority, e.g. a lawyer in good standing with his state or provincial bar. After the person has been duly verified by a registration authority in the manner prescribed by law, the registration authority may then create a user account for the user to access the system. The user account, which may contain user profile information and optionally any cryptographic material assigned to the user, may be stored at the status verification server (SVS) 80 or its associated user database 82. In one embodiment, the cryptographic material may include user-specified credentials known only to the user.

As part of the user account creation process for the newly verified user, a status verification request is sent to the LB-SVS 84 to ascertain that the registration authority is himself a member in good standing with the licensing body and that he has full and complete capacity to verify and vouch for the identity of the new user. The continually updated status of each registration authority is thus stored in one of a plurality of licensing body status verification servers (generally one per jurisdiction) which may be queried in real-time by a web interface to ascertain that the registration authority still has legal capacity to act as a registration authority, e.g. that the lawyer has not been disbarred, suspended or has otherwise lost his license to practice.

The registration authority thus adds the user to the user database 82 of users who have been duly verified by a registration authority. In like manner, an organization such as a corporation, limited partnership, trust, etc. may be verified by a registration authority and added to the database 82. The database 82 may thus store any entity, be it a corporation, natural person, etc. Each registration authority (RA) must have within its jurisdiction the legal capacity to verify the identity of an entity such as an organization (e.g. a corporation, limited partnership, trust, etc) or a natural person. Once verified by an RA, an account or profile for the organization or person may be created in a database 82 associated with the SVS 80. A cryptographic key, certificate or token may be associated with the user account or organization account. In this manner, the SVS maintains a database of verified entities (organizations and users) who have been duly verified by a registration authority and are thus unique in the system. The user account or profile may contain information, data or parameters indicating the legal capacity of the user to take on various roles. The RA can then assign a role to the registered user after ensuring that the user has the full legal capacity to act. The RA then grants authority to the user by assigning the role to the user. This grant of authority from the RA to the first member can only be done if the first member is verified and has legal capacity to act in the role. This is the first link in the chain of trust.

To summarize, the computer system includes an application server (DITMS 90) having a processor operatively coupled to a memory to execute a document-interaction and transaction management (DITM) application. This application enables interaction with electronic documents securely stored in a virtual vault 92 and electronic transactions to be performed for the organization.

The system includes a licensing body server (LB-SVS 84) for verifying a legal status of a first user seeking to act as a registration authority. The LB-SVS receives a status verification request from the SVS or DITMS. The LB-SVS stores status information regarding the legal status of registration authorities. The LB-SVS thus acts to ascertain that the first user who purports to be a registration authority is currently licensed in that jurisdiction to act as the registration authority.

The status verification server (SVS 80) stores status information about organizations and members whose legal status has been verified by the registration authority or any other registration authority deriving authority from an original registration authority.

The DITM application executing on the DITMS 90 is programmed to (1) send a status verification request to the LB-SVS 84 to verify the status of the registration authority; (2) send a status verification request to the SVS 80 to verify a status of an organization; (3) receive user input from the registration authority to create an account for the organization within the application hosted by DITMS 90; (4) send a status verification request to the SVS 80 to verify a status of a first member of the organization and (5) receive user input at DITMS 90 to define a first role within the organization for the first member. The first role confers a first authority to act on behalf of the organization. The first authority is thus predicated on the registration authority. In embodiments of the invention, the registration authority also verifies that the first member has a legal capacity to act in the first role. This ensures that the first member is legally entitled to occupy the first role, unlike conventional RBAC systems which do not take into consideration the legal capacity of a user to occupy a given role. By verifying the legal capacity of a user to act in a given role, the system imposes an actual legal framework on the users of the system. The system can thus act as an auditing mechanism which can be employed to prove ex post facto that users acted in accordance with the legal requirements at the time a given act was undertaken in the system.

The document-interaction and transaction management (DITM) application thus provides a virtual platform for interacting with digital documents of an organization that are securely stored in a virtual vault and for performing electronic acts or transactions for, or on behalf of, the organization. The acts may be internal acts relating, for example, to the internal governance of the organization or external acts relating, for example, to contracts entered into with other organizations. Permissions for these acts are based on the roles assigned within the organization. Each role is defined to have a legal authority (i.e. power or capacity) to perform one or more tasks, acts, actions or transactions. Each role derives its legal authority ultimately from a registration authority.

In other words, the status of a registration authority (RA) is verified by sending a status verification request to a licensing body server, e.g. LB-SVS 84. The RA then verifies the legal status of an organization and of a first member (or of a plurality of first members) of the organization. Authorities conferred on a member are thus predicated on the registration authority. This creates a chain of trust linking the authority of a member of the organization to the registration authority. This paradigm imposes the real-world legal requirements for verifying identities on the system. As a consequence, the system guarantees that there is legal authority for an electronic action performed within the system by a user occupying a role that was granted through a chain of trust by a registration authority.

Roles in the computer system are defined such that they rely directly or indirectly on a registration authority who is licensed by a licensing body to verify the identity of any legal entity such as an organization or person. This paradigm ensures that every registered user of the system has been duly verified by a registration authority. The users may then be assigned roles by the registration authority which confer rights or permissions to undertake certain acts in the system. Any action by the user within the system is presumed to be legally valid as the authority of the user derives ultimately from the registration authority. This creates a chain of trust originating from a registration authority to a verified user of the system. Because of the chain of trust, other users of the system may presume that the acts of a given user is valid and enforceable. This chain-of-trust paradigm transposes onto a digital platform the real-world process of verifying each user's identity and ascertaining that the user's role confers proper authority to take certain acts. This technology greatly facilitates acts that are internal to the organization (e.g. resolutions, shareholder votes, or other internal governance processes) and also acts that are external to the organization (e.g. tendering, procurement, contracting).

The system architecture depicted in FIG. 1 is presented as one example implementation. It will be appreciated that the system may be implemented with other architectures by consolidating or distributing the various server functions. It will also be appreciated that the system may be implemented in a cloud-computing environment.

Method of Managing Role-Based Rights

This technology enables a computerized method of managing role-based rights within an organization that has a hierarchical structure of roles such as a corporation. The method involves verifying the registration authority, and then verifying the identity of the user who is to be assigned a role within an organization (by checking that the user is registered in the SVS as a person whose identity has been verified by an RA) and also verifying the legal capacity of that user to act in the role to be assigned. Such a method creates a chain of trust that ensures that the member appointed to the role within the organization has been appointed in accordance with legal requirements imposed in that jurisdiction.

For clarity, it is to be understood that this method is presented from the perspective of the DITM application as a user creates an organization, selects users to become the members of that organization, and then assigns roles to these members. This would be the case when a corporation account is created in the application by a registration authority. As a prerequisite, the legal status of the corporation must be verified. The users who are to be selected as the members of the organization must also be verified. The members must then be assigned roles, e.g. as directors, officers, shareholders, employees, etc. within the corporation. The method begins when a first user (e.g. a lawyer) who purports to be a registration authority (RA) wishes to create the organization account within the DITM application. The first user as an ostensible RA logs into the system and requests creation of an organization account, e.g. an account for a client corporation. The system will verify initially that the first user (the lawyer) is currently still a valid RA. To do so, his status is checked with the LB-SVS 84 (e.g. the professional status database maintained by his state or provincial bar).

Figure 2:
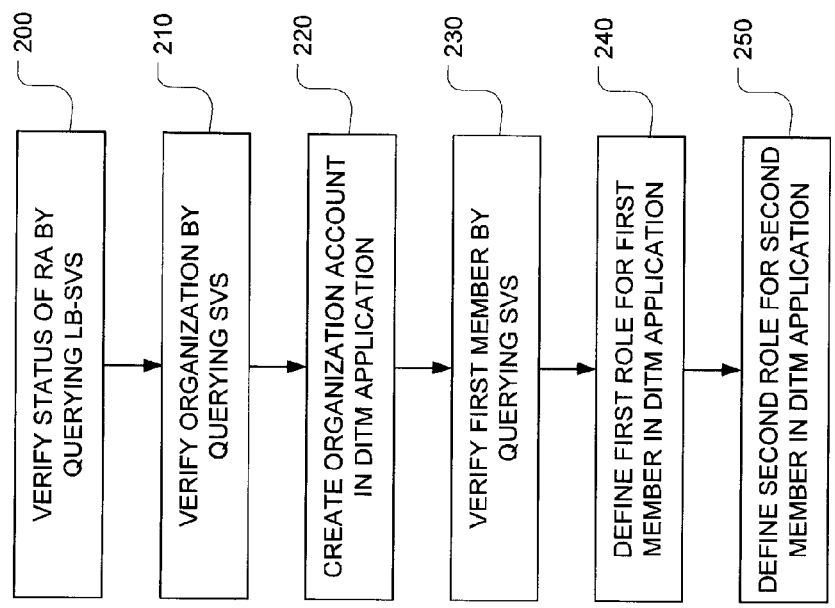
FIG. 2 is a flowchart outlining main steps of a method of managing role-based digital rights.

The method thus depicts in FIG. 2 an initial step 200 of verifying a legal status of a first user seeking to act as a registration authority. This is done by sending a status verification request through the network to a licensing body server (LB-SVS) that stores status information regarding the legal status of the first user. The status verification request may be a message or datagram in a predefined format that specifies the name and/or professional license registration number of the user. The LB-SVS executes software that is programmed to recognize the predefined format and automatically search and obtain the status information. This status verification request ascertains whether the first user is licensed to act as the registration authority (RA). Assuming the first user is a valid RA, the application then allows the RA to act. The RA may thus request that the SVS be queried as to whether the corporation in question is a known entity (i.e. whether the corporation has already been verified by an RA). This verification may have been performed by the RA himself or previously by another RA, i.e. any other RA deriving authority from an original RA. In any event, the corporation's identity (legal status), if it's been verified by an RA, has been entered into the SVS database. The DITM server queries the SVS to verify that the corporation is a known entity. Thus, at step 210, a legal status of an organization is verified by sending a status verification request to the SVS. Assuming that the corporation is known to the SVS because it has been previously verified, an affirmative status reply is communicated back to the DITMS from the SVS. The RA is then able to create an account for the organization within the DITM application.

Accordingly, at step 220, the method involves receiving user input from the RA to create an account for the organization within the DITM application.

The RA will then assign a role to a selected user who is a first member of the organization. To do so, the DITM queries the SVS to ascertain that the selected user is a known entity, i.e. that the selected user has been verified by an RA and that the user has the capacity to take on the role to be assigned.

Accordingly, at step 230, the system verifies a legal status of the first member of the organization by sending a status verification request to the SVS. Assuming the first member has been verified by an RA, the SVS will reply with an acknowledgement that the first member is known. The RA can then assign a role within the organization to the first member because the first member has been verified. The registration authority also verifies that the first member has a legal capacity to act in the first role. For example, the first role may a director of a corporation. In a given jurisdiction, there may requirements that the director be a resident, be of the certain minimum age, etc. These requirements are verified by the RA prior to assigning this role to the member. The verification of the legal capacity to assume a role may also be automated by the system. In one embodiment, the system compares attributes of the user from the user account or user profile with a set of rules, parameters or requirements that reflect the legal requirements of the role. For example, the role may require that the user be a citizen or resident of the jurisdiction, that the user have no criminal record, that the user be of a minimum age, that the user have a professional status, degree, certification, elected status, appointed status, delegated status, etc. These attributes can be entered into the user account within the user database 82. These personal attributes form part of the user's profile. These attributes may be input and verified when the RA verifies the user's identity. The system can then automatically query the user database to compare the attributes with the requirements.

Therefore, at step 240, the application receives user input from the RA to define a first role within the organization for the first member. The first role confers a first authority to act on behalf of the organization. The first authority is thus predicated on the registration authority.

A further optional step 250 comprises receiving user input from the first member to create a second role for a second member in compliance with internal governance rules that are determined by legal requirements imposed on the organization, the second role conferring a second authority to act on behalf of the organization, thereby creating a chain of trust that predicates the second authority of the second role on the first authority of the first role which, in turn, is predicated on the status verification of the registration authority. The internal governance rules, e.g. a majority-rule system for a board of directors, is imposed on the first members by the RA, requiring that any action the first member take comply with the legal framework imposed on the first members. The first members may agree (by majority vote) to change the internal governance rules but this vote is constrained by the original legal framework imposed by the RA in accordance with the law of the jurisdiction governing the organization. Any statutory, regulatory, or other legal requirements for an organization within a given jurisdiction may be programmed into the system as rules or parameters governing how the members may act. In other words, a hierarchy of roles may be created within the organization, each obtaining its authority from the previous role. In that sense, a role may be understood as conveying a set of rights, one right being the right to create a role. Each role (and its authority) can thus be traced back through the hierarchy to the first member(s) of the organization who received his authority from the registration authority. This is termed the chain of trust.

In one implementation, the SVS (or one or more applications, modules or the like executing on the SVS) guides the RA through the verification process by displaying (e.g. via a Web interface of the SVS) the legal requirements to perform a verification as mandated by law in a given jurisdiction. In most embodiments, the SVS stores the legal verification requirements for each of a plurality of different jurisdictions for each of a plurality of different types of entities that may be created in the system. In other words, the SVS stores in memory the verification requirements that are displayed to the RA when the RA specifies the type of entity and the jurisdiction. The verification requirements thus serve as a guide or tool in performing the requisite steps for verifying an entity. The requirements are drawn from the legal framework (e.g. the laws, statutes, regulations, codes, bylaws, etc., governing the constitution of an entity in a given jurisdiction.

An example of the legal framework is, for example, Article 335 of the Civil Code of Quebec which reads: The board of directors manages the affairs of the legal person and exercises all the powers necessary for that purpose; it may create management positions and other organs, and delegate the exercise of certain powers to the holders of those positions and to those organs. The board of directors adopts and implements management by-laws, subject to approval by the members at the next general meeting. The legal person may be, for example, a corporation, trust, etc. From this framework follows the authority of the board and the capacity to create management positions and to delegate the exercise of certain powers. The present system provides a digital platform that replicates the general legal framework for each type of entity for each jurisdiction.

In one implementation, the SVS determines the jurisdiction in response to user input from the RA, determines the type of entity also in response to user input from the RA and then presents to the RA a checklist of acts that the RA must perform in order to comply with the verification requirements, i.e. in order to properly verify that the organization or entity has been duly constituted or created. The RA then clicks on the various boxes of the checklist to indicate that he has performed each of the required verifications. The verification checklist is generated automatically by the SVS based on the type of entity and the jurisdiction governing the entity. In addition or in lieu of the checklist, the SVS may display fields for data entry, requiring that the RA enter data or information collected from the entity. For example, the SVS may require the RA to enter a corporation number and a passcode. The SVS will then query a corporate registry or other government database to determine if the corporation number and passcode are correct. Similarly, the SVS may require the RA to enter the names of all directors and their social security numbers (or social insurance numbers). The SVS can then verify this data by querying a government database. These are simple examples to illustrate how the SVS may challenge or test the RA to ensure that the RA is engaging in a full and complete verification.

Optionally, the SVS may store electronic copies of any supporting documents (e.g. scans of photo ID cards, passports, digital fingerprints, voice prints or other biometrics, digitally signed certificates from corporate registries, etc.) that the RA has used in verifying the entity. This supporting data may be encrypted or non-encrypted in the SVS. Encryption may be used to control access to this data so that only one RA or a group of RA's has access to it.

Optionally, the SVS may perform conflict checks to ensure that the status of one organization does not conflict with another organization already registered in the system. The SVS may display a warning if there is a conflict, in one embodiment, which the RA may manually override by providing suitable user input to the SVS. For example, the system may flag a corporate name conflict between one entity in one jurisdiction and another entity in a different jurisdiction which would not have been identified by the corporation registries of each jurisdiction acting separately and alone.

In a similar vein, the SVS may optionally perform a conflict check to ensure that a user acting as a member of one organization does not preclude the same user member from acting as a member of another organization. For example, a first organization may appoint a first member on condition that the first member devote all of his time and attention to the affairs of the first organization. The SVS may warn the RA if he attempts to assign a role to that same first member in a second organization.

The method may further comprise a step of receiving user input from the second member to perform a restricted action in the application, a step of verifying that the second member has requisite authority to perform the restricted action, and a step of performing the restricted action in the application only if the second member has the requisite authority. The requisite authority depends on the role the user/member occupies.

The method may further comprise assigning a plurality of first roles to a plurality of first members, the first members being governed by a reconfigurable majority-rule governance scheme. For example, in the case of a corporation, the plurality of first members are the first directors. Generally, the role of director is assigned a set of rights and permissions. The directors are governed by a majority-rule governance scheme. The directors can then vote to change or reconfigure the governance scheme. All actions flow from the initial framework that is instituted by the RA for the corporation which replicates the real-world legal framework for the corporation.

Method of E-Commerce

This technology also enables a computerized method of e-commerce between a first organization and a second organization. Each organization has a hierarchical structure of roles which confer different authorities to transact on behalf of the respective organizations. The problem that conventionally arises in e-commerce is that one party must rely on ostensible authority of the other party. In other words, there is no way to know with certainty and in a timely manner whether the other party has the proper authority (i.e. is legally entitled) to contractually bind his organization. The capacity to act is typically a question of the user's role within the organization. The present solution to this problem is to have each organization share a common web-hosted document-interaction and transaction management (DITM) application that interfaces with the SVS. The DITM application and the SVS cooperate to ensure that at a minimum the organization and the members have been duly verified by a registration authority. Furthermore, the system ensures that roles have been assigned to the members by the registration authority in accordance with applicable statutory and regulatory requirements for the type of organization in question.

This computerized method thus enables a member of the first organization to know whether a member of the second organization actually has authority to act on behalf of the first organization.

Figure 3:
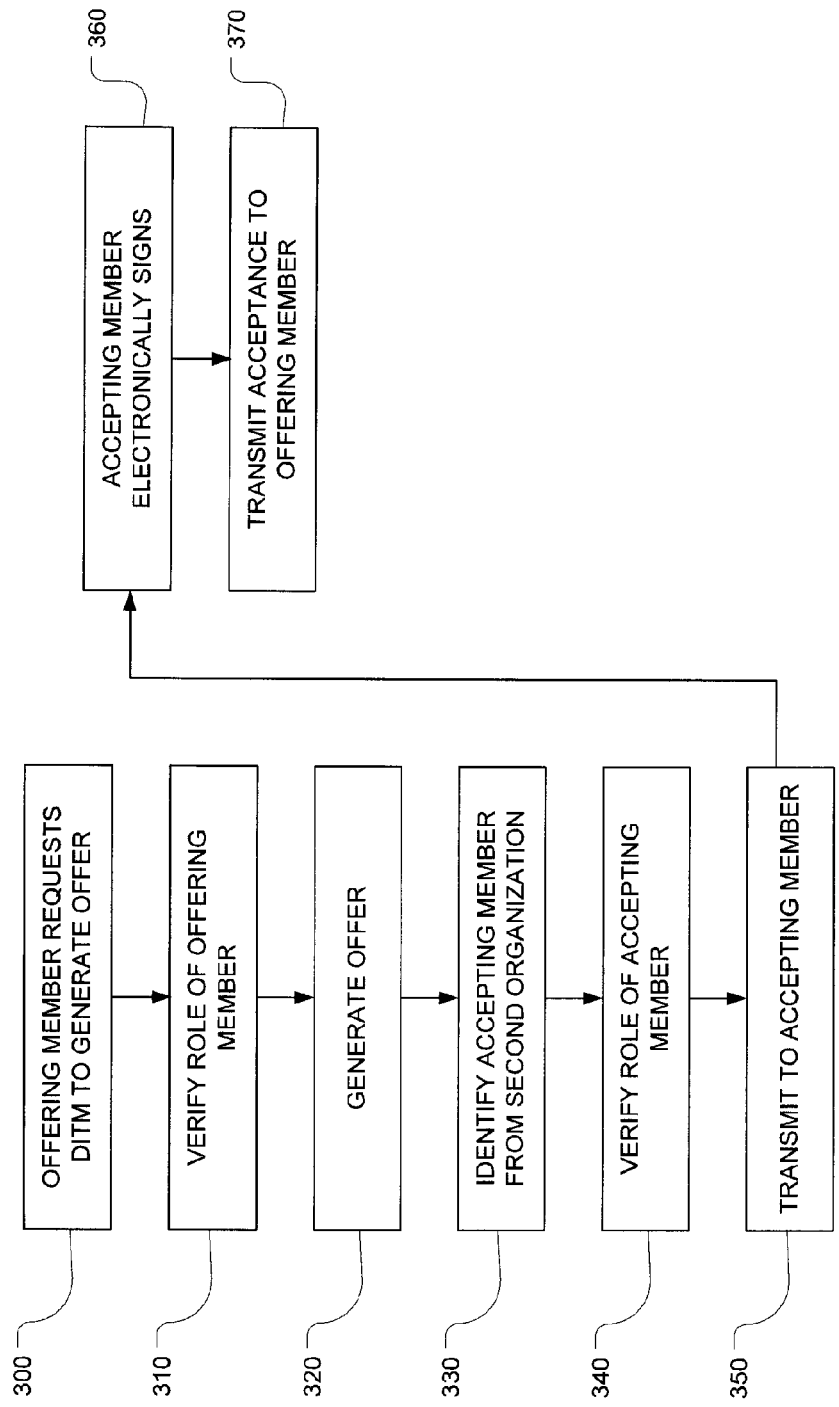
FIG. 3 is a flowchart outlining main steps of a method of e-commerce.

With reference to FIG. 3, the method is initiated at step 300 when the DITM application receives user input from an offering member of the first organization. The offering member requests that the application generate an electronic contract document representing an offer to enter into a contract.

In response, at step 310, the application verifies that the offering member of the first organization occupies a role having authority to contractually bind the first organization with respect to the contract, the role having been defined by a first member whose status has been verified by a registration authority. The legal capacity of the member to occupy the role is also verified by the registration authority to ensure that the appointment of the member to that role is in conformity with any applicable legal requirements.

At step 320, the application generates the electronic contract document and permits the first member to electronically sign the document only if the offering member has the authority to contractually bind the first organization with respect to the contract.

At step 330, the offering member then provides user input identifying an accepting member who is to receive the electronic document at the second organization.

The application verifies that the accepting member occupies a role conferring authority to accept the offer on behalf of the second organization at step 340. The role has been defined by a second member whose status has been verified by a registration authority. In some embodiments, some elements of the legal capacity of the user to occupy that role has also been verified, either directly by the RA or by the system in response to input or a command from the RA.

At step 350, the application then transmits the electronic contract document from the offering member of the first organization to the accepting member of the second organization if the accepting member has the authority to accept the offer.

At step 360, the application then receives user input from the accepting member of the second organization who may electronically sign the document to accept the offer. Finally, an electronic acceptance is transmitted to the offering member of the first organization.

Because both organizations and their respective members have been verified by the SVS, there is presumed authority for the actions taken by each member on behalf of their respective organizations. This enables an e-commerce transaction to proceed without uncertainty as to whether the persons purporting to have authority to contract actually have the requisite authority to contractually bind their respective organizations. This computer system thus provides a web-based or cloud-based platform for e-commerce.

FIGS. 4 to 7 depict various examples of user interfaces ("screens" or "pages") that the system may present to enable the RA to perform the verification and role assignment tasks.

Figure 4:
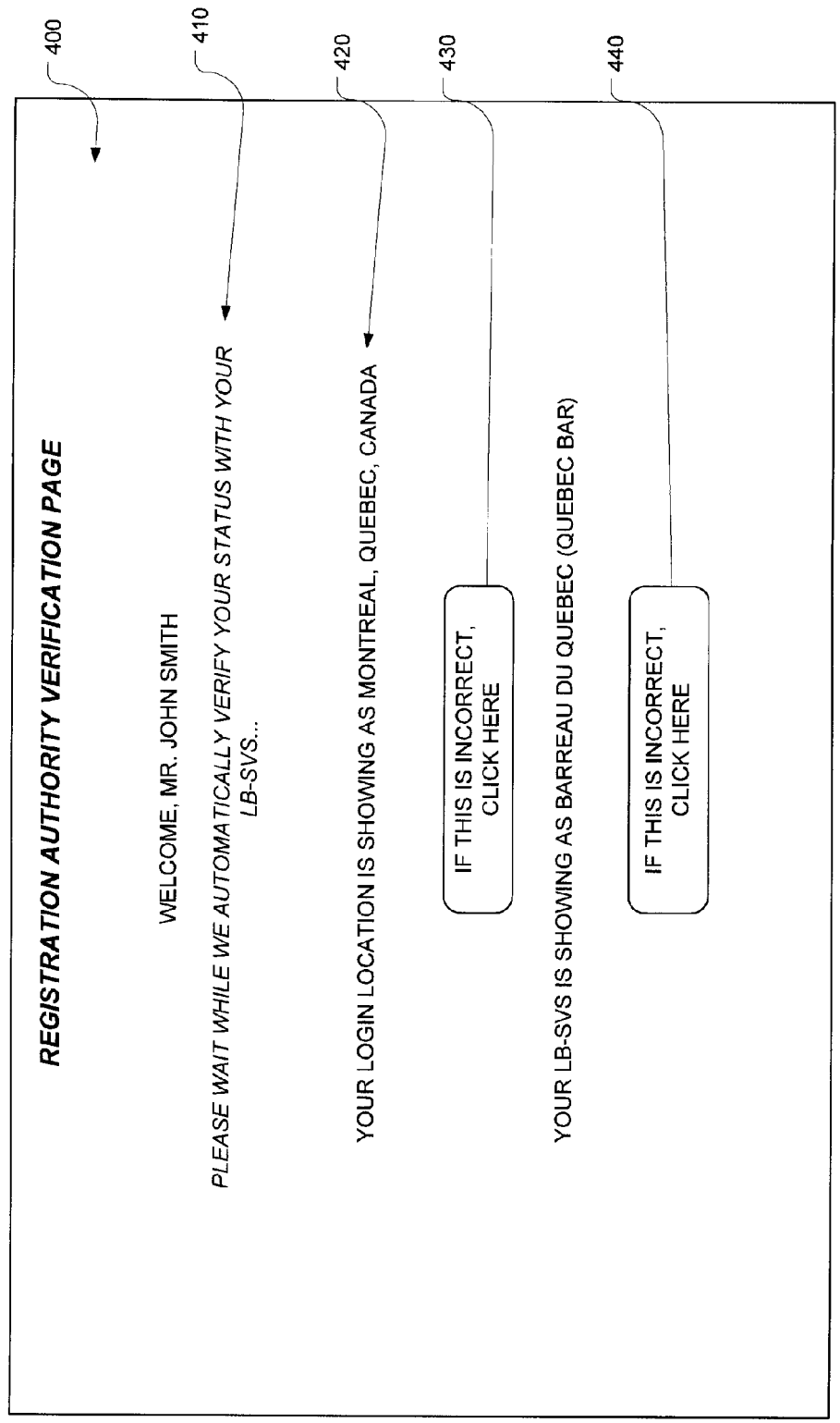
FIG. 4 is an example of a registration authority (RA) verification page.

As shown by way of example in FIG. 4, a registration authority verification page 400 may include welcome information and an indication 410 that the RA's status is being automatically verified with the appropriate LB-SVS. Optionally, a location indication 420 of the detected current location of the RA may be displayed along with a button 430 to correct this if the location information is incorrect. Optionally, an LB-SVS identifier 440 is displayed indicating which LB-SVS is being queried along with a correction button 450. This is useful for an RA who is a member in good standing of two different licensing bodies for two different jurisdictions, e.g. the bar of New York and the bar of Quebec.

Figure 5:
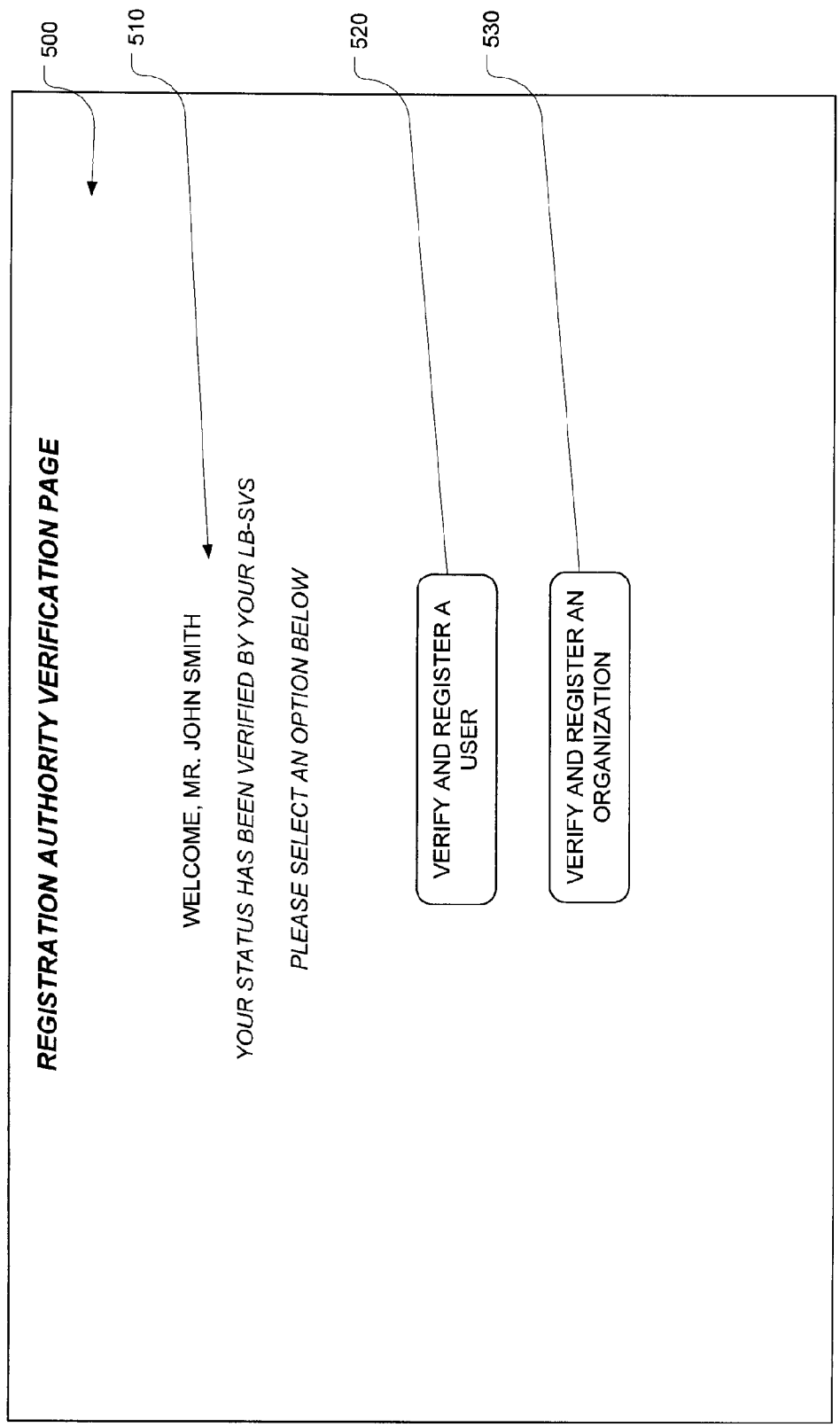
FIG. 5 is an example of a subsequent RA verification page.

As shown by way of example in FIG. 5, a further registration authority verification page 500 may be displayed when the LB-SVS returns an affirmative status reply. The welcome information 510 is updated. User interface elements 520, 530 are displayed to permit the RA to verify a user or organization.

Figure 6:
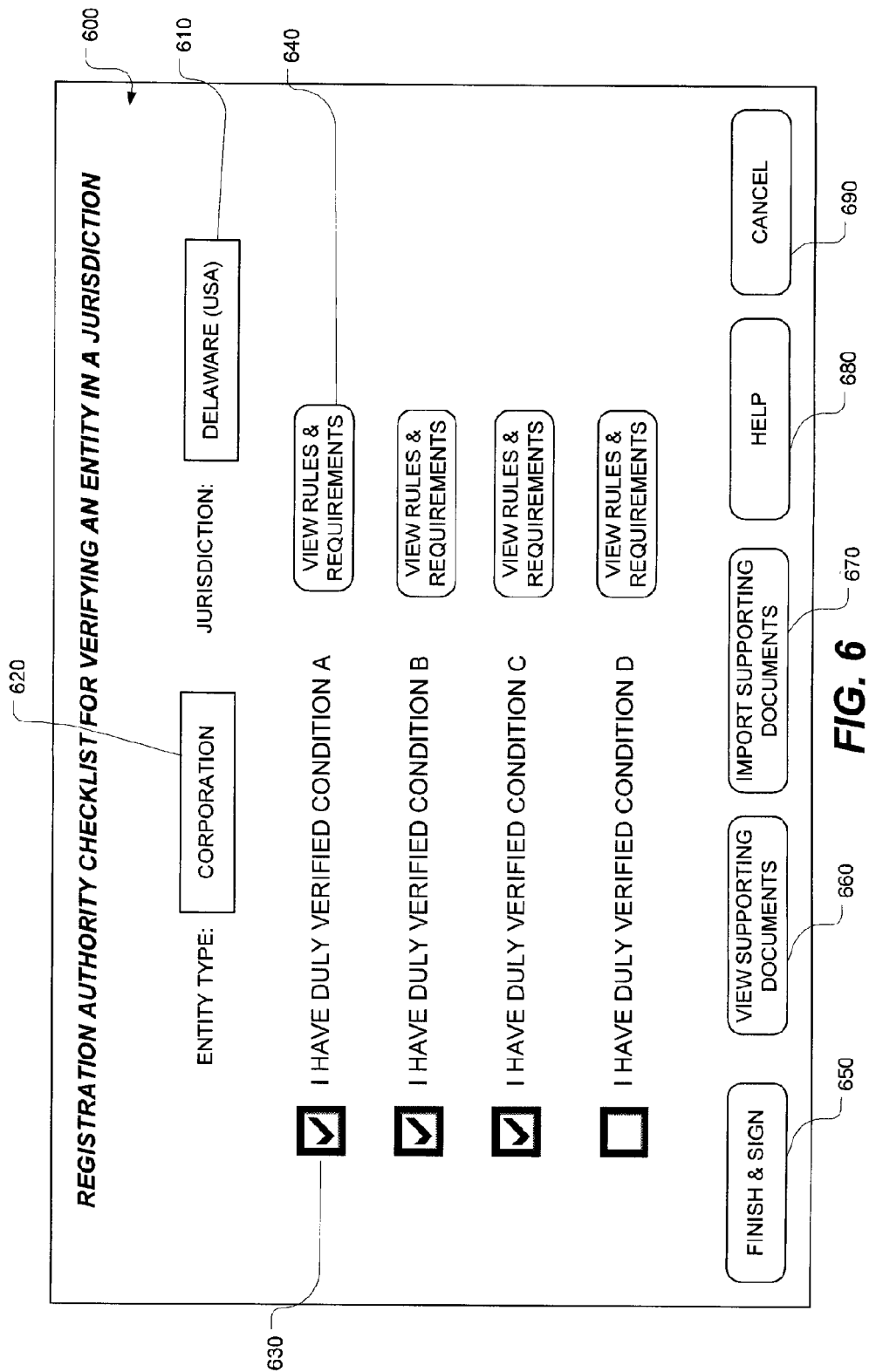
FIG. 6 is an example of an RA checklist.

As shown by way of example in FIG. 6, the system may present a registration authority checklist 600 for the RA to guide the RA through the process of verifying an entity in a given jurisdiction. Jurisdiction information 610 and entity type information 620 may be presented. Optionally, checkboxes 630 may be provided for the RA to check when each condition has been verified. Optionally, a button 640 to view applicable rules and requirements may be provided for each condition. Optionally, the screen 600 may include various task buttons 650, 660, 670, 680, 690 may be presented for various tasks like finishing/signing, viewing supporting documents, importing supporting documents, requesting help, or cancelling the screen.

Figure 7:
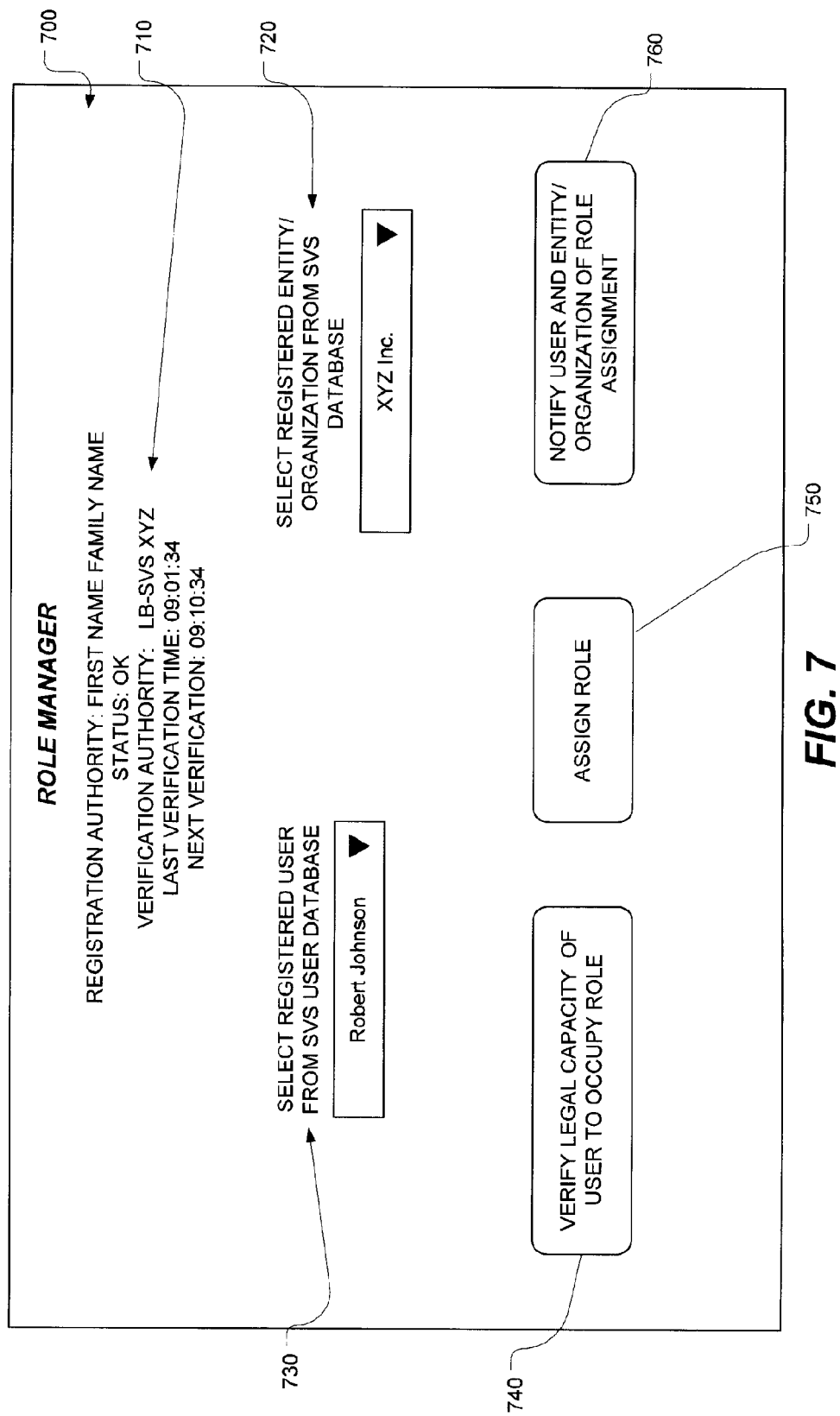
FIG. 7 is an example of a role manager screen that the RA uses to assign a role to a user.

FIG. 7 is an example of a role manager screen 700 that permits the RA to assign a role to a registered user. Optionally, the screen 700 may depict RA information including the RA's name, status, LB-SVS, and last verification time and next verification time. The role manager screen 700 may optionally include a user interface element 720 to select a registered entity from the SVS database and a user interface element 730 to select a registered user from the SVS database who is to be assigned a role within the selected entity. Optionally, the screen 700 includes user interface elements 740, 750, 760 to verify the legal capacity of the user to occupy the role, to assign the role and to notify the user and/or entity of the role assignment.

Figure 8:
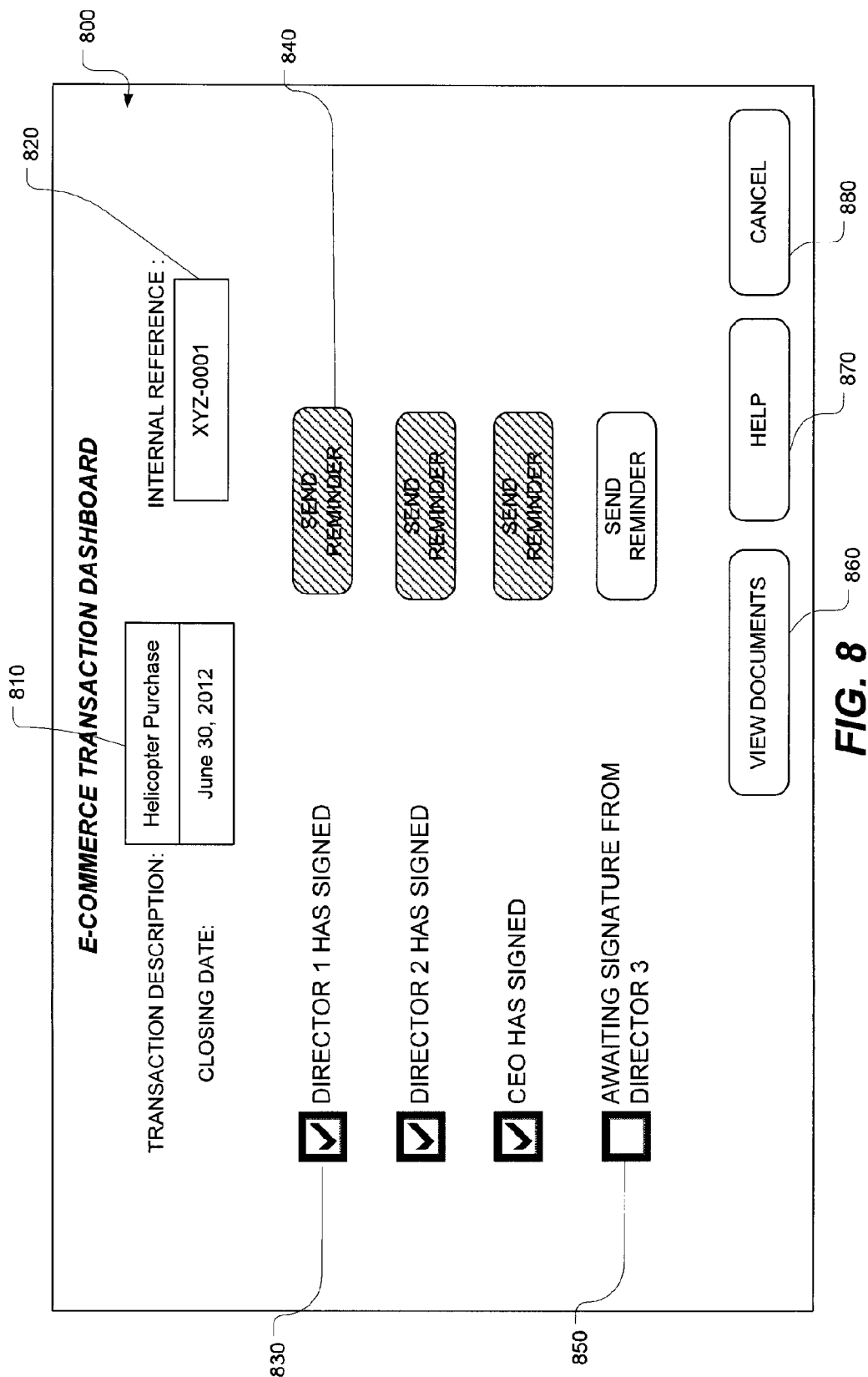
FIG. 8 is an example of an e-commerce transaction dashboard.

In one implementation, the method entails displaying a transaction dashboard such as the one shown by example in FIG. 8. This e-commerce transaction dashboard 800 may in the illustrated embodiment display or otherwise present names and respective roles of all of the members that must electronically sign the document to be legally valid and further displaying a signature status indicating whether each member has signed the document. For example, as shown in FIG. 8, the dashboard 800 presents transaction description 810, a closing data, an internal reference number 820 to identity the transaction in question. Checkboxes 830 or other status indicators may display whether each required member has signed off on the transaction. A send reminder button (or other user interface element) 840 may be provided to send a reminder to a member who has not yet approved the transaction. The unchecked box 850 may be accompanied by a description that the system is awaiting signature from the member, as shown. An automatic reminder system may also be provided to automatically communicate reminders to those members who have not yet signed off. Other buttons or user interface elements may be displayed such as a view documents button 860, a help button 870 and a cancel 880. Additionally or alternatively, the dashboard may sequentially notify each of the members who must electronically sign the document in a predetermined order. This dashboard enables offering and accepting members to efficient manage the transaction by ensuring that all members have signed off.

In one implementation, the method entails creating and sending a counteroffer to the first organization and determining if the offering member of the first organization still has authority to accept the counteroffer. The counteroffer may, for example, be for a larger amount of money for which the offering member no longer has authority. This optional feature would check whether the terms of the counteroffer are still within the scope of the offering member's capacity to contract.

In one implementation, the method entails determining that the accepting member is non-responsive, determining whether the offer is time-limited, and automatically notifying another member whose role confers an equivalent authority to accept the offer. This feature enables the transaction to be approved by another member if the original offering member or accepting member is unavailable for any reason, e.g. away on vacation, out of the office on business travel, on sick leave, etc.

Applicability to Legal Acts in Virtual Worlds

In another implementation, the present technology may be adapted to a virtual world or virtual environment. A virtual world is an online computer-generated game or simulation in which users interact with objects in their environment and with each other through their respective avatars. An example of a virtual world is Second Life™. Commerce between avatars in the virtual world is conducted with a virtual currency which may have real-world value. For example, in Second Life™, virtual currency known as Linden dollars may be purchased with real-world US dollars. An avatar may earn or spend Linden dollars in the virtual world and then redeem or exchange the Linden dollars for real-world US dollars. It is thus possible to make money in the virtual world. Commercial disputes that arise in the virtual world are difficult to resolve using traditional approaches (i.e. recourse to a court of law or alternative dispute resolution mechanisms) because of a variety of legal issues such as questions of jurisdiction and the real-world identity of the avatar. Other legal issues (property ownership, torts, etc.) also cannot be easily resolved in a virtual world, primarily because of issues of identity. In other words, one of the fundamental problems that arises in a virtual world is that the avatar cannot be easily legally linked to a real-world entity. The present technology addresses this basic problem by employing a registration authority to verify that a user is legally the virtual extension of the user. Once verified by the RA, the user and his avatar are registered in the SVS or its associated user database.

Figure 9:
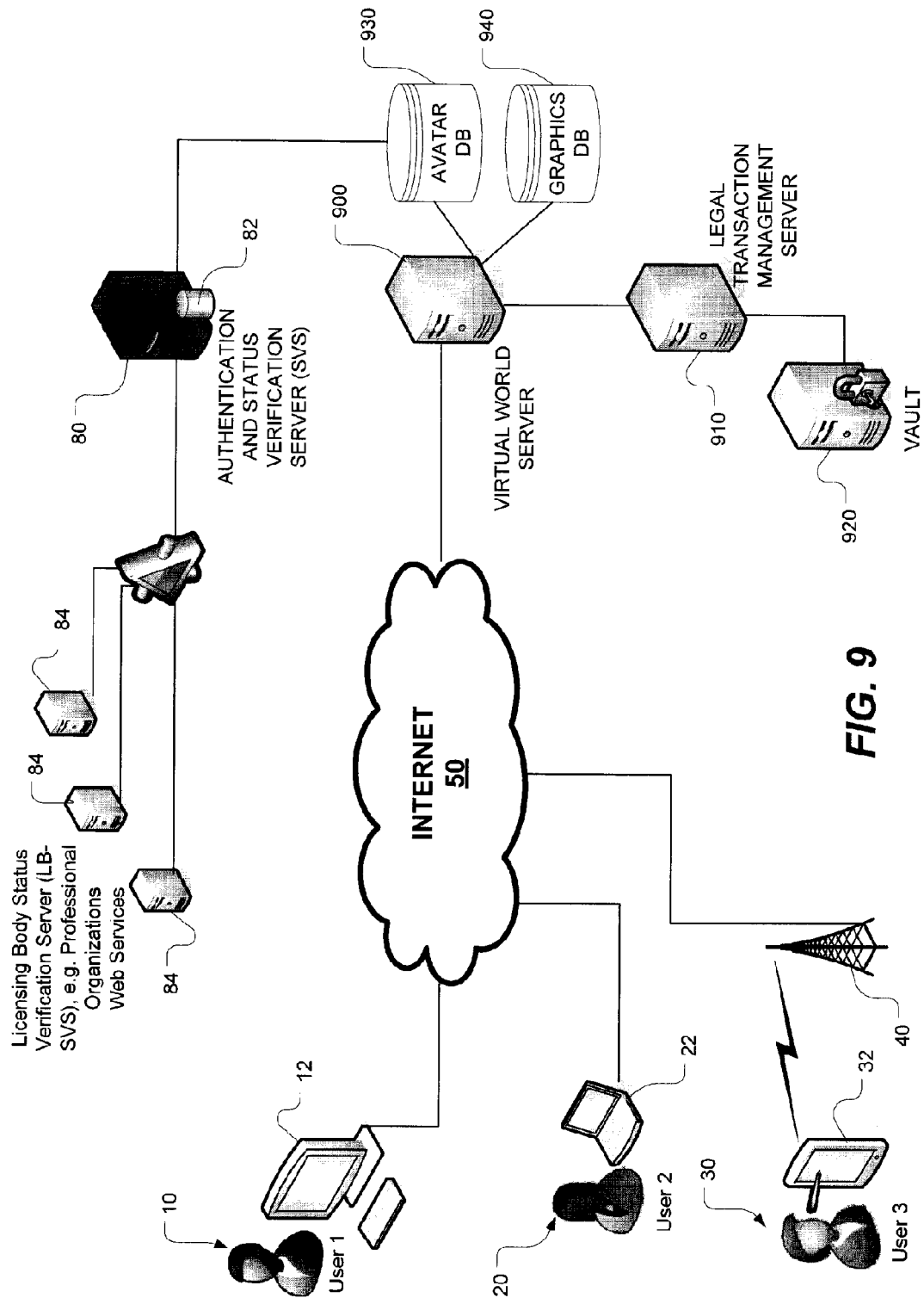
FIG. 9 is a schematic depiction of a computer system for conferring legal authority to avatars that represent users within a computer-generated virtual world.

An example of a generic web-based virtual world computer system is depicted in FIG. 9. The virtual world software engine (application) executes on a virtual world server 900 (or server cluster or cloud). The virtual world server 900 may have an avatar database 930 (storing avatar information, attributes, properties, etc.) and a graphics database 940 (storing scene data for the virtual environments that form the virtual world). The virtual world server 900 can require formal user registration with the SVS 80, which entails verification of the user by the RA and storage of the verified user information in the user database 82 in association with the user's unique avatar. User access to the virtual world can thus be controlled so that only known and registered users 10, 20, 30 whose identities have been duly verified by a registration authority can access the virtual world.

The computer system depicted in FIG. 9 therefore provides a virtual e-commerce platform or legal transaction management platform that is based on a modified version of the DITM application which is referred to herein in the context of a virtual world as a legal transaction management (LTM) application. The LTM application executes on the legal transaction management server 910 and may include or be connected to a secure document vault 920 for securely storing contracts, digitally signed documents, or other such data. The LTM server 910 relies on a registration authority for verifying the identity of the users 10, 20, 30 of the virtual world. Once verified, the user account at SVS database 82 legally links the users to their avatars. A certificate may be issued to enable users via their avatars to digitally sign contracts and to engage in formal legal acts in the virtual world such as buying or selling property, entering into contracts of employment or service, entering into legal matrimony with another avatar, executing a last will and testament, etc. Any act taken by the user via his avatar in the virtual world will thus have a legal effect since the avatar is legally connected to the registered user.

The SVS may be employed to store the registered users and the corresponding avatars. The DITM application may be adapted or transformed into a virtual-world legal transaction management (LTM) application that interfaces with the virtual world game engine or game platform to provide an add-on platform or module for any legal transactions such as commercial contracts between avatars, virtual property-related transactions, formations of virtual corporations, etc.

In other words, the legal transaction management application enables legally binding interactions and transactions between avatars within the virtual world. If a dispute arises between two avatars in the virtual world, the identity of the actual real-world users can be ascertained. The avatar has the legal authority in the virtual world to legally bind the user. This creates a chain of trust linking the avatar to the real-world user whose identity has been properly verified in accordance with law with a registration authority whose own status as a registration authority was verified at the time the user account was created. Users of the virtual world can thus interact with other avatars with a much enhanced sense of trust in reliance on the fact that the avatars are legal extensions of registered users whose identities have been properly verified by a registration authority having a legal capacity to verify the identities of persons within a given jurisdiction.

Verification of the RA and of users of the virtual world may be accomplished using the LB-SVS and the SVS. As depicted in FIG. 10, a status verification request is transmitted at step 1000 to a licensing body status verification server (LB-SVS) to ascertain that the RA is licensed to practice as an RA in that jurisdiction. A further status verification request is transmitted at step 1010 to the SVS to verify that the user is a registered user whose identity has been verified by an RA. Once these verifications have been performed, the RA may create a user account at step 1020, thereby admitting the user as a member of the virtual world.

In one embodiment, the legal transaction management (LTM) application controls, manages and mediates all legal transactions within the virtual world. For example, if User A wishes to enter into a contract with User B (which is effectively e-commerce conducted in a virtual world via avatars), then the LTM application verifies that the users have real-world authority to enter into the contract. For example, the user may only be legally entitled to enter a contract if the user is of the age of majority. As another example, the user may only be entitled to transfer ownership to another user who fulfills certain criteria. The legal transaction management application thus polices certain actions to ensure that they are undertaken in accordance with the legal capacity of the users and in accordance with the authority conferred on the avatar by the user.

As depicted by way of example in FIG. 10, the LTM application enables commerce in a virtual world. The LTM may process a virtual contract between avatars according to a method as follows: at step 1030, the LTM application receives user input from a first user controlling a first avatar in the virtual world that causes the first avatar to present an offer to enter into a contract to a second avatar representing a second user, e.g. by communicating a electronic document representing the offered contract from the first avatar to the second avatar. This offer is presented in the virtual world. However, the offer may indirectly have a real-world effect, i.e. actual legal ramifications to the users, assuming there is a correlation between the value of currency (money) in the virtual world and the value of currency the real world. The LTM application then automatically verifies at step 1040 that the first user and the second user have legal authority to enter into the contract. At step 1050, the LTM application then permits the second user to accept the offer to form a legally binding contract only if the first and second users have legal authority to contract. For example, the legal transaction management application may consider various factors and conditions in determining whether the avatars have the legal authority from their users to enter the contract. The factors and conditions may include the object of the contract, the age of each user, the residency of each user, the value of the transaction, restrictions imposed on the avatars by the virtual world, restrictions imposed on the avatars by the users, etc. The LTM application thus provides a system for avatars to engage in transactions that are meant to have direct or indirect legal effect in the real-world. The SVS furthermore acts as a gatekeeper or guardian of the virtual world, ensuring that only registered users whose identities have been verified by a registration authority are admitted to the virtual world. This creates a closed online community of trusted entities in which every avatar is linked to a single user such that the user cannot repudiate the acts of his avatar.

Any of the methods disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method of managing role-based digital rights in a computer system, the method comprising:
   receiving login credentials via a user interface of a computing device from a first user seeking to act as a registration authority, wherein the computing device is communicatively connected via a data network to a status verification server so as to communicate the login credentials to the status verification server;
   receiving a request from the computing device operated by the first user to create an account for an organization having a hierarchical structure of roles with which are associated different role-based digital rights;
   in response to the request, verifying a legal status of the first user seeking to act as the registration authority by sending a status verification request from the status verification server over the data network as a datagram in a predefined format to a licensing body server that stores status information regarding the legal status of the first user and that is programmed to recognize the predefined format of the datagram and to automatically search and obtain status information for the first user to ascertain that the first user is licensed to act as the registration authority, wherein the licensing body server automatically generates a status reply;

the status verification server processing the status reply to automatically decide if the first user is licensed to act as the registration authority, the status verification server selectively permitting user input via the user interface of the computing device from the registration authority to create the account for the organization and to cause the account to be stored in the status verification server;

if the first user is not licensed to act as the registration authority, the status verification server automatically preventing the first user from creating the account for the organization;

receiving a further request from the registration authority to create an account for a first member of the organization;

sending a status verification request to the status verification server to verify a status of the first member;

sending a status verification request to the status verification server to verify a status of the organization;

if the status of the first member and the status of the organization are verified, permitting user input via the user interface of the computing device from the registration authority to define a first role within the organization for the first member, the first role conferring a first authority to act on behalf of the organization, wherein the first authority of the first member is predicated on the registration authority; and if the status of the first member or the status of the organization is not verified, preventing the registration authority from defining the first role within the organization for the first member.

2. The method as claimed in claim 1 further comprising receiving user input via the user interface from the first member to create a second role for a second member in compliance with internal governance rules that are determined by legal requirements imposed on the organization, the second role conferring a second authority to act on behalf of the organization, thereby creating a chain of trust that predicates the second authority of the second role on the first authority of the first role which, in turn, is predicated on the status verification of the registration authority.

3. The method as claimed in claim 2 comprising:
receiving user input via the user interface from the second member to perform a restricted action in the application;
verifying that the second member has requisite authority to perform the restricted action; and
performing the restricted action in the application only if the second member has the requisite authority.

4. The method as claimed in claim 1 comprising assigning a plurality of first roles to a plurality of first members, the first members being governed by a reconfigurable majority-rule governance scheme.

5. A computer-readable medium comprising programmed instructions in code which, when loaded into a memory and executed by a processor of a computing device, causes the computing device to:

receive login credentials via a user interface of the computing device from a first user seeking to act as a registration authority, wherein the computing device is communicatively connected via a data network to a status verification server so as to communicate the login credentials to the status verification server;

receive a request from the first user to create an account for an organization having a hierarchical structure of roles with which are associated different role-based digital rights;

in response to the request, verify a legal status of the first user seeking to act as the registration authority by sending a status verification request over the data network as a datagram in a predefined format to a licensing body server that stores status information regarding the legal status of the first user and that is programmed to recognize the predefined format of the datagram and to automatically search and obtain status information for the first user to ascertain that the first user is licensed to act as the registration authority, wherein the licensing body server automatically generates a status reply;

the status verification server processing the status reply to automatically decide if the first user is licensed to act as the registration authority, selectively permitting user input via a user interface from the registration authority to create the account for the organization and to cause the account to be stored in a status verification server;

if the registration authority is not licensed to act, automatically prevent the first user from creating the account;

receive a further request from the registration authority to create an account for a first member of the organization;

send a status verification request to the status verification server to verify a status of the first member;

send a status verification request to the status verification server to verify a status of the organization;

if the status of the first member and the status of the organization are verified, permit user input via the user interface from the registration authority to define a first role within the organization for the first member, the first role conferring a first authority to act on behalf of the organization, wherein the first authority of the first member is predicated on the registration authority; and if the status of the first member or the status of the organization is not verified, prevent the registration authority from defining the first role for the first member.

6. The computer-readable medium as claimed in claim 5 further comprising code to receive user input via the user interface from the first member to create a second role for a second member in compliance with internal governance rules that are determined by legal requirements imposed on the organization, the second role conferring a second authority to act on behalf of the organization, thereby creating a chain of trust that predicates the second authority of the second role on the first authority of the first role which, in turn, is predicated on the status verification of the registration authority.

7. The computer-readable medium as claimed in claim 6 comprising code for:
receiving user input via the user interface from the second member to perform a restricted action in the application;
verifying that the second member has requisite authority to perform the restricted action; and performing the restricted action in the application only if the second member has the requisite authority.

8. The computer-readable medium as claimed in claim 5 comprising code for assigning a plurality of first roles to a plurality of first members, the first members being governed by a reconfigurable majority-rule governance scheme.

9. A computer system for managing role-based digital rights, the system comprising:
a computing device connected to a data network, the computing device being operated by a first user seeking to act as a registration authority;
an application server connected to the computing device via the data network, the application server having a processor operatively coupled to a memory to receive login credentials from the computing device provided by the first user and to receive a request over the data network from the first user to create an account for an organization having a hierarchical structure of roles with which are associated different role-based digital rights, and to send over the data network, in response to the request, a status verification request as a datagram in a predefined format;
a licensing body server connected to the data network for verifying a legal status of a first user seeking to act as the registration authority by receiving the status verification request and providing status information regarding the legal status of the first user and that is programmed to recognize the predefined format of the datagram and to automatically search and obtain status information for the first user to ascertain that the first user is licensed to act as the registration authority, wherein the licensing body server automatically generates a status reply;
a status verification server processing the status reply to automatically decide if the first user can act as the registration authority and for storing status information about organizations and members whose legal status has been verified by the registration authority or any other registration authority deriving authority from an original registration authority;
wherein the application server is configured to:
send the status verification request to the licensing body server to verify the status of the registration authority in response to the request to create the account for the organization;
if the registration authority is licensed to act, automatically permit user input via a user interface from the registration authority to create the account for the organization;
if the registration authority is not licensed to act, automatically prevent the first user from creating the account for the organization;
receive a further request from the registration authority to create an account for a first member of the organization;
send a status verification request to the status verification server to verify a status of a first member of the organization;
if the status of the first member and the status of the organization are verified, permit user input via the user interface to define a first role within the organization for the first member, the first role conferring a first authority to act on behalf of the organization, wherein the first authority of the first member is predicated on the registration authority; and
if the status of the first member or the status of the organization is not verified, prevent the first role from being defined for the first member.

10. The system as claimed in claim 9 wherein the application is programmed to receive user input via the user interface from the first member to create a second role for a second member in compliance with internal governance rules that are determined by legal requirements imposed on the organization, the second role conferring a second authority to act on behalf of the organization, thereby creating a chain of trust that predicates the second authority of the second role on the first authority of the first role which, in turn, is predicated on the status verification of the registration authority.

11. The system as claimed in claim 10 wherein the application is programmed to:
receive user input via the user interface from the second member to perform a restricted action in the application;
verify that the second member has requisite authority to perform the restricted action; and
perform the restricted action in the application only if the second member has the requisite authority.

12. The system as claimed in claim 9 wherein the application is programmed to assign a plurality of first roles to a plurality of first members, the first members being governed by a reconfigurable majority-rule governance scheme.

13. A computerized method of e-commerce between a first organization and a second organization each having a hierarchical structure of roles defined within a shared web-hosted document-interaction and transaction management application, wherein the roles confer different authorities to transact on behalf of the respective organizations, the method comprising:
providing an application server having a processor coupled to a memory for executing instructions in code of the document-interaction and transaction management application connected over a data network to first and second computing devices operated by the first and second organizations;
verifying that a registration authority has authority to verify members of the organizations by sending a status verification request over the data network as a datagram in a predefined format to a licensing body server that is programmed to recognize the predefined format of the datagram and to automatically search and obtain status information to ascertain that the registration authority is licensed to act, wherein the licensing body server automatically generates a status reply;
processing the status reply by a status verification server to automatically decide if the registration authority is licensed to act;
verifying by the registration authority that a first member of the first organization has a legal capacity to act in a first role within the first organization;
if the legal capacity of the first member is verified, automatically permitting the first member to define a role for an offering member and if the legal capacity of the first member is not verified, preventing the first member from defining the role for the offering member;
verifying by the registration authority that a second member of the second organization has a legal capacity to act in a second role within the second organization;
if the legal capacity of the second member is verified, automatically permitting the second member to define a role for an accepting member and if the legal capacity of the second member is not verified, preventing the second member from defining the role for the accepting member;

receiving user input via the user interface from the offering member of the first organization requesting that the application generate an electronic contract document representing an offer to enter into a contract;

verifying by the application that the offering member of the first organization occupies a role having authority to contractually bind the first organization with respect to the contract;

generating the electronic contract document and permitting the first member to electronically sign the document only if the offering member has the authority to contractually bind the first organization with respect to the contract;

receiving user input via the user interface identifying the accepting member who is to receive the electronic document at the second organization;

verifying by the application that the accepting member occupies a role conferring authority to accept the offer on behalf of the second organization;

transmitting the electronic contract document from the offering member of the first organization to the accepting member of the second organization if the accepting member has the authority to accept the offer;

receiving user input via the user interface from the accepting member of the second organization by electronically signing the document to accept the offer; and transmitting an electronic acceptance of the contract to the offering member of the first organization.

14. The method as claimed in claim 13 further comprising displaying a transaction dashboard presenting names and respective roles of all of the members that must electronically sign the document to be legally valid and further displaying a signature status indicating whether each member has signed the document.

15. The method as claimed in claim 13 further comprising sequentially notifying each of the members who must electronically sign the document in a predetermined order.

16. The method as claimed in claim 13 further comprising creating and sending a counteroffer to the first organization and determining if the offering member of the first organization still has authority to accept the counteroffer.

17. The method as claimed in claim 13 further comprising determining that the accepting member is non-responsive, determining whether the offer is time-limited, and automatically notifying another member whose role confers an equivalent authority to accept the offer.

18. A computer-readable medium comprising programmed instructions in code which, when loaded into a memory and executed by a processor of one or more computing devices, causes the one or more computing devices to execute a document-interaction and transaction management application fore-commerce between a first organization and a second organization each having a hierarchical structure of roles conferring different authorities to transact on behalf of the respective organizations, by:

providing an application server having a processor coupled to a memory for executing instructions in code of the document-interaction and transaction management application connected over a data network to first and second computing devices operated by the first and second organizations;

verifying that a registration authority has authority to verify members of the organizations by sending a status verification request over the data network as a datagram in a predefined format to a licensing body server that is programmed to recognize the predefined format of the datagram and to automatically search and obtain status information to ascertain that the registration authority is licensed to act, wherein the licensing body server automatically generates a status reply;

processing the status reply by a status verification server to automatically decide if the registration authority is licensed to act;

verifying by the registration authority that a first member of the first organization has a legal capacity to act in a first role within the first organization;

if the legal capacity of the first member is verified, automatically permitting the first member to define a role for an offering member and if the legal capacity of the first member is not verified, preventing the first member from defining the first role for the offering member;

verifying by the registration authority that a second member of the second organization has a legal capacity to act in a second role within the second organization;

if the legal capacity of the second member is verified, automatically permitting the second member to define a role for an accepting member and if the legal capacity of the second member is not verified, preventing the second member from defining the second role for the accepting member;

receiving user input via the user interface from the offering member of the first organization requesting that the application generate an electronic contract document representing an offer to enter into a contract;

verifying by the application that the offering member of the first organization occupies a role having authority to contractually bind the first organization with respect to the contract;

generating the electronic contract document and permitting the first member to electronically sign the document only if the offering member has the authority to contractually bind the first organization with respect to the contract;

receiving user input via the user interface identifying an accepting member who is to receive the electronic document at the second organization;

verifying by the application that the accepting member occupies a role conferring authority to accept the offer on behalf of the second organization;

transmitting the electronic contract document from the offering member of the first organization to the accepting member of the second organization if the accepting member has the authority to accept the offer;

receiving user input via the user interface from the accepting member of the second organization by electronically signing the document to accept the offer; and transmitting an electronic acceptance of the contract to the offering member of the first organization.

19. The computer-readable medium as claimed in claim 18 further comprising code for displaying a transaction dashboard presenting names and respective roles of all of the members that must electronically sign the document to be legally valid and further displaying a signature status indicating whether each member has signed the document.

20. The computer-readable medium as claimed in claim 18 further comprising code for sequentially notifying each of the members who must electronically sign the document in a predetermined order.

21. The computer-readable medium as claimed in claim 18 further comprising code for creating and sending a counteroffer to the first organization and determining if the offering member of the first organization still has authority to accept the counteroffer.

22. The computer-readable medium as claimed in claim 18 further comprising code for determining that the accepting member is non-responsive, determining whether the offer is time-limited, and automatically notifying another member whose role confers an equivalent authority to accept the offer.

23. A computer system for e-commerce, the system comprising:
an application server having a processor coupled to a memory for executing instructions in code of a document-interaction and transaction management application to facilitate e-commerce between a first organization and a second organization each having a hierarchical structure of roles conferring different authorities to transact on behalf of the respective organizations;
first and second computing devices operated by the first and second organizations, respectively, and connected over a data network with the application server;
a licensing body server connected to the data network for verifying that a registration authority has authority to verify members of the organizations;
a status verification server for verifying that a registration authority has authority to verify members of the organizations by sending a status verification request over the data network as a datagram in a predefined format to the licensing body server that is programmed to recognize the predefined format of the datagram and to automatically search and obtain status information to ascertain that the registration authority is licensed to act, wherein the licensing body server automatically generates a status reply;
wherein the status verification server processes the status reply to automatically decide if the registration can act and wherein the status verification server is in communication with the application server for verifying by the registration authority that a first member of the first organization has a legal capacity to act in a first role within the first organization and, if the legal capacity of the first member is verified, signalling to the application that the first member is authorized to define a role for an offering member and if the legal capacity of the first member is not verified, automatically preventing the registration authority from defining the role for the offering member;
the status verification also verifying by the registration authority that a second member of the second organization has a legal capacity to act in a second role within the second organization and, if the legal capacity of the second member is verified, signalling to the application that the second member is authorized to define a role for an accepting member and if the legal capacity of the second member is not verified, preventing the second member from defining the role of the accepting member;
the first computing device having a user interface for receiving user input from the offering member of the first organization requesting that the application generate an electronic contract document representing an offer to enter into a contract;
the application verifying that the offering member of the first organization occupies a role having authority to contractually bind the first organization with respect to the contract;
the application generating the electronic contract document and permitting the offering member to electronically sign the document only if the offering member has the authority to contractually bind the first organization with respect to the contract;
the first computing device receiving user input via the user interface identifying the accepting member who is to receive the electronic document at the second organization;
the application verifying that the accepting member occupies a role conferring authority to accept the offer on behalf of the second organization;
the application transmitting the electronic contract document from the offering member of the first organization to the accepting member of the second organization if the accepting member has the authority to accept the offer;
the second computing device having a user interface for receiving user input from the accepting member of the second organization by electronically signing the document to accept the offer; and
the application transmitting an electronic acceptance of the contract to the offering member of the first organization.

24. The system as claimed in claim 23 wherein the second computing device displays a transaction dashboard presenting names and respective roles of all of the members that must electronically sign the document to be legally valid and further displaying a signature status indicating whether each member has signed the document.

25. The system as claimed in claim 23 wherein the second computing device sequentially notifies each of the members who must electronically sign the document in a predetermined order.

26. The system as claimed in claim 23 wherein the second computing device receives user input via the user interface from the accepting member to create and send a counteroffer to the first organization and wherein the application determines if the offering member of the first organization still has authority to accept the counteroffer.

27. The system as claimed in claim 23 wherein the application comprises code for determining that the accepting member is non-responsive, determining whether the offer is time-limited, and automatically notifying another member whose role confers an equivalent authority to accept the offer.

28. A computer-implemented method of managing role-based digital rights in a computer system, the method comprising:
receiving login credentials via a user interface of a computing device from a first user seeking to act as a registration authority, wherein the computing device is communicatively connected via a data network to a status verification server so as to communicate the login credentials to the status verification server;
receiving a request from the first user to create an account for a second user;
in response to the request, verifying a legal status of the first user by sending a status verification request over the data network as a datagram in a predefined format to a licensing body status verification server that is programmed to recognize the predefined format of the datagram and to automatically search and obtain status information for the first user to ascertain that the registration authority is licensed to act as the registration authority, wherein the licensing body server automatically generates a status reply;
processing the status reply to automatically decide if the legal status of the first user to act as the registration authority is verified by the licensing body status verification server, and selectively permitting user input via a user interface from the registration authority to create an account for the second user;

creating a certificate for the second user, the certificate indicating that the second user has been verified by the registration authority; and if the legal status of the first user is not verified, automatically preventing the registration authority from creating the account for the second user.

29. A computer-implemented method of conferring legal authority to avatars that represent users within a computer-generated virtual world in which the users interact with each other via their respective avatars, the method comprising:

providing a virtual world server;

executing a virtual world software engine on the virtual world server to enable the users to interact with each other via their respective avatars;

storing in a memory of the virtual world server an avatar database storing avatar information for the avatars;

storing in the memory of the virtual world server a graphic database storing scene data for the virtual environments that form the virtual world;

registering a new user who is seeking to become a member of the virtual world by:

receiving login credentials via a user interface of a computing device from a first user seeking to act as a registration authority, wherein the computing device is communicatively connected via a data network to a status verification server so as to communicate the login credentials to the status verification server;

verifying a legal status of the first user seeking to act as the registration authority by sending a status verification request over the data network as a datagram in a predefined format to a licensing body status verification server that is programmed to recognize the predefined format of the datagram and to automatically search and obtain status information for the first user to ascertain that the first user is licensed to act as the registration authority, wherein the licensing body server automatically generates a status reply;

processing the status reply to automatically decide if the registration authority is licensed to act, selectively permitting user input via a user interface from the registration authority to create an account for the member within the virtual world, the account linking the member to a unique avatar in the virtual world, wherein the authority of the avatar in the virtual world is predicated on the registration authority;

if the registration authority is not licensed to act, automatically preventing the registration authority from creating the account;

storing the account in a status verification server linking the avatar to the member;

issuing a certificate to the member for use in the virtual world; and in response to a status verification request for status information about the member, verifying by the status verification server a current status of the member and providing by the status verification server the status information regarding the current status of the member.

30. The method as claimed in claim 29 further comprising providing a legal transaction management application that enables legally binding interactions and transactions between avatars within the virtual world.

31. The method as claimed in claim 29 further comprising:

receiving user input via the user interface from a first user controlling a first avatar in the virtual world that causes the first avatar to present an offer to enter into a contract to a second avatar representing a second user;

automatically verifying by consulting the status verification server that the first user and the second user have legal authority to enter into the contract; and permitting the second user to accept the offer to form a legally binding contract only if the first and second users have legal authority.

\* \* \* \* \*